(12) United States Patent
Nishikiori et al.

(10) Patent No.: US 7,349,791 B2
(45) Date of Patent: Mar. 25, 2008

(54) CONTROL APPARATUS FOR INTERNAL COMBUSTION ENGINE

(75) Inventors: Takashi Nishikiori, Susono (JP); Mamoru Yoshioka, Susono (JP); Norihisa Nakagawa, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 112 days.

(21) Appl. No.: 10/585,668

(22) PCT Filed: Oct. 13, 2005

(86) PCT No.: PCT/JP2005/019252

§ 371 (c)(1), (2), (4) Date: Jul. 7, 2006

(87) PCT Pub. No.: WO2006/054417

PCT Pub. Date: May 26, 2006

(65) Prior Publication Data

US 2008/0041339 A1    Feb. 21, 2008

(51) Int. Cl.
- G06F 19/00 (2006.01)
- F02M 25/07 (2006.01)
- F02B 47/08 (2006.01)

(52) U.S. Cl. ............. 701/108; 123/568.14; 123/568.21

(58) Field of Classification Search ............ 123/198 F, 123/325, 481, 493, 568.11, 568.14, 568.21; 701/101–105, 108, 110, 111, 115

See application file for complete search history.

(56) References Cited

U.S. PATENT DOCUMENTS

| 4,320,726 | A  | * | 3/1982 | Etoh et al. ............... 123/198 F |
| 4,391,240 | A  | * | 7/1983 | Sugasawa et al. ....... 123/198 F |
| 6,694,956 | B2 | * | 2/2004 | Kawaguchi et al. ... 123/568.21 |
| 2007/0156322 | A1 | * | 7/2007 | Soga et al. ................. 701/104 |

FOREIGN PATENT DOCUMENTS

| JP |     04284147 A | * | 10/1992 | ............. 123/198 F |
| JP | A 06-123258 | 5/1994 |
| JP | A 09-209844 | 8/1997 |
| JP | A 10-009005 | 1/1998 |
| JP | A 11-101144 | 4/1999 |
| JP | A 11-107839 | 4/1999 |
| JP | A 11-351044 | 12/1999 |
| JP | A 2000-220462 | 8/2000 |
| JP | A 2001-159355 | 6/2001 |
| JP |   2001-271673 | 10/2001 |
| JP | A 2004-183615 | 7/2004 |

* cited by examiner

*Primary Examiner*—Willis R. Wolfe, Jr.
(74) *Attorney, Agent, or Firm*—Oliff & Berridge, PLC

(57) ABSTRACT

An acceleration request is detected in accordance with an accelerator opening PA (time t3 in FIG. 5B). If the detected acceleration request is a moderate acceleration request, an idle opening TA0 is set as an actual throttle opening TA (FIG. 5E), and a request for retarding an intake valve timing VVT is issued (FIG. 5D). Recovery from fuel cut-off is achieved at time t4 at which a misfire limit value (combustion assurance VVT value L) is reached by an actual VVT value (FIG. 5A).

10 Claims, 9 Drawing Sheets

CONTROL APPARATUS FOR INTERNAL COMBUSTION ENGINE

TECHNICAL FIELD

The present invention relates to a control apparatus for an internal combustion engine, and more particularly to an internal combustion engine control apparatus that is suitable for controlling the internal combustion engine that includes means for varying the amount of exhaust gas recirculation into a combustion chamber while fuel is cut off at the time of deceleration.

BACKGROUND ART

A conventional engine intake air amount control apparatus disclosed, for instance, by Patent Document 1 includes a control mechanism for varying the valve timing of an intake valve and a control mechanism for varying the opening of a throttle valve. When controlling the intake air amount, the technology incorporated in the above conventional control apparatus avoids a torque difference from being generated by a sudden accelerator pedal operation by providing a response delay correction not only for the above valve timing control but also for throttle valve opening control.

Another known technology disclosed, for instance, by Patent Document 2 flows an exhaust gas back into a combustion chamber while fuel is cut off at the time of deceleration. A catalyst positioned in an exhaust path of an internal combustion engine is likely to deteriorate when a lean gas supply is received in a high-temperature environment. The technology disclosed by Patent Document 2 can prevent the catalyst from deteriorating because it can inhibit a lean, high-temperature gas from being supplied to the catalyst while fuel is cut off at the time of deceleration.

The applicant of the present invention has acknowledged that the following documents relate to the present invention including the aforementioned documents:

[Patent Document 1]
  Japanese Patent Laid-Open No. 2001-159355

[Patent Document 2]
  Japanese Patent Laid-Open No. 1997-209844

[Patent Document 3]
  Japanese Patent Laid-Open No. 1998-9005

[Patent Document 4]
  Japanese Patent Laid-Open No. 1999-351044

[Patent Document 5]
  Japanese Patent Laid-Open No. 1999-107839

[Patent Document 6]
  Japanese Patent Laid-Open No. 2004-183615

DISCLOSURE OF INVENTION

When recovery (forced recovery) is to be achieved from fuel cut-off in compliance with a driver's acceleration request, the acceleration request is detected in accordance, for instance, with an accelerator opening PA and throttle opening TA. When the acceleration request is detected in such a manner, it is concluded that the condition for forced recovery is established. Subsequently, fuel injection resumes with the throttle opening TA adjusted in compliance with the request indicated by the accelerator opening PA.

The system described in Patent Document 1 can change a valve overlap period by controlling the valve timing of an intake valve. If the valve overlap period is extended while fuel is cut off at the time of deceleration, the internal EGR amount increases. In other words, the system described in Patent Document 1 can increase the amount of exhaust gas recirculation during fuel cut-off at the time of deceleration by advancing the valve opening phase of the intake valve.

However, if the system described in Patent Document 1 immediately resumes fuel injection in a situation where the throttle opening TA gradually increases in response to a request for acceleration into a low-load region (a request for gradual acceleration), which is issued at the time of forced recovery from fuel cut-off, combustion deterioration or misfire occurs because the amount of fresh air inflow to a combustion chamber is insufficient and the amount of exhaust gas recirculation does not adequately decrease.

The present invention has been made to solve the above problem. It is an object of the present invention to provide an internal combustion engine control apparatus that is capable of preventing combustion deterioration or misfire from occurring in an internal combustion engine having means for varying the exhaust gas recirculation amount during fuel cut-off at the time of deceleration, at the time of forced recovery from fuel cut-off for gradual acceleration.

The above object is achieved by an internal combustion engine control apparatus which includes fuel cut-off means for cutting off fuel at the time of internal combustion engine deceleration and EGR control means for controlling the amount of exhaust gas recirculation. The EGR control means is capable of varying the amount of exhaust gas recirculation into a combustion chamber while fuel is cut off at the time of deceleration. Forced recovery condition judgment means is provided for judging according to an acceleration request detected during fuel cut-off at the time of deceleration that the condition for forced recovery from the fuel cut-off is established. Degree-of-requested-acceleration judgment means is also provided for judging the degree of requested acceleration in accordance with the acceleration request. Combustibility judgment means, which, when the degree-of-requested-acceleration judgment means judges that the acceleration request is a request for acceleration into a low-load region, judges whether combustion can be resumed is further provided. The EGR control means decreases the amount of exhaust gas recirculation when the condition for forced recovery is established, and includes fuel injection resumption means, which resumes fuel injection when the combustibility judgment means judges that combustion can be resumed.

The above object is achieved by an internal combustion engine control apparatus which includes fuel cut-off means for cutting off fuel at the time of internal combustion engine deceleration and EGR control means for controlling the amount of exhaust gas recirculation. The EGR control means is capable of varying the amount of exhaust gas recirculation into a combustion chamber while fuel is cut off at the time of deceleration. Forced recovery condition judgment means is provided for judging according to an acceleration request detected during fuel cut-off at the time of deceleration that the condition for forced recovery from the fuel cut-off is established. Degree-of-requested-acceleration judgment means is also provided for judging the degree of requested acceleration in accordance with the acceleration request. Combustibility judgment means, which, when the degree-of-requested-acceleration judgment means judges that the acceleration request is a request for acceleration into a low-load region, judges whether combustion can be resumed is further provided. The EGR control means decreases the amount of exhaust gas recirculation when the condition for forced recovery is established, and includes fuel injection resumption means, which resumes fuel injection when the combustibility judgment means judges that combustion can be resumed.

In a third aspect of the present invention, the internal combustion engine control apparatus may include throttle opening increase prohibition means for avoiding a larger throttle opening than an idle opening until combustion is judged to be resumable.

In a fourth aspect of the present invention, the throttle opening is forcibly made larger than the idle opening if a predetermined period of time elapses since the detection of the acceleration request during a period before combustion is judged to be resumable.

In a fifth aspect of the present invention, the EGR control means may include at least either variable valve timing control means, which increases/decreases the amount of internal exhaust gas recirculation by driving a variable valve mechanism that varies a valve overlap period during which an intake valve opening period overlaps with an exhaust valve opening period, or EGR valve control means, which increases/decreases the amount of external exhaust gas recirculation by adjusting the opening of an EGR control valve that is installed in an exhaust gas back-flow path for communicating between an intake path and an exhaust path.

In a sixth aspect of the present invention, the combustibility judgment means may judge according to at least either the amount of drive provided for the variable valve mechanism or the opening of the EGR valve whether combustion can be resumed.

According to a first or second aspect of the present invention, when forced recovery from fuel cut-off is achieved on the basis of a request for acceleration into a low-load region (a request for moderate acceleration), the internal EGR is attenuated until combustion can resume and then a process for recovering from fuel cut-off, that is, the resumption of fuel injection is performed. Therefore, in an internal combustion engine that the exhaust gas is recirculated positively during fuel cut-off at the time of deceleration, the present invention can avoid the occurrence of combustion deterioration or misfire when forced recovery from fuel cut-off is achieved for moderate acceleration.

According to the third aspect of the present invention, the present aspect of the invention can prevent catalysts displaced in an exhaust path from deteriorating by the fresh air that is not subjected to combustion before fuel injection resumption.

According to the fourth aspect of the present invention, the present aspect of the invention can prevent the response to a driver's acceleration request from deteriorating. Consequently, the present aspect of the invention can avoid drivability deterioration.

According to the fifth aspect of the present invention, the internal EGR and/or the external EGR is attenuated until combustion can resume and then a process for recovering from fuel cut-off is performed. Therefore, in an internal combustion engine that the internal EGR gas and/or the external EGR gas is recirculated positively during fuel cut-off at the time of deceleration, the present invention can avoid the occurrence of combustion deterioration or misfire when forced recovery from fuel cut-off is achieved for moderate acceleration.

According to the sixth aspect of the present invention, the present invention can avoid the occurrence of combustion deterioration or misfire which is caused by a response delay of attenuation of the exhaust gas recirculation by variable valve timing control means and/or EGR valve control means.

BEST MODE FOR CARRYING OUT THE INVENTION

First Embodiment

[System Configuration]

Figure 1:
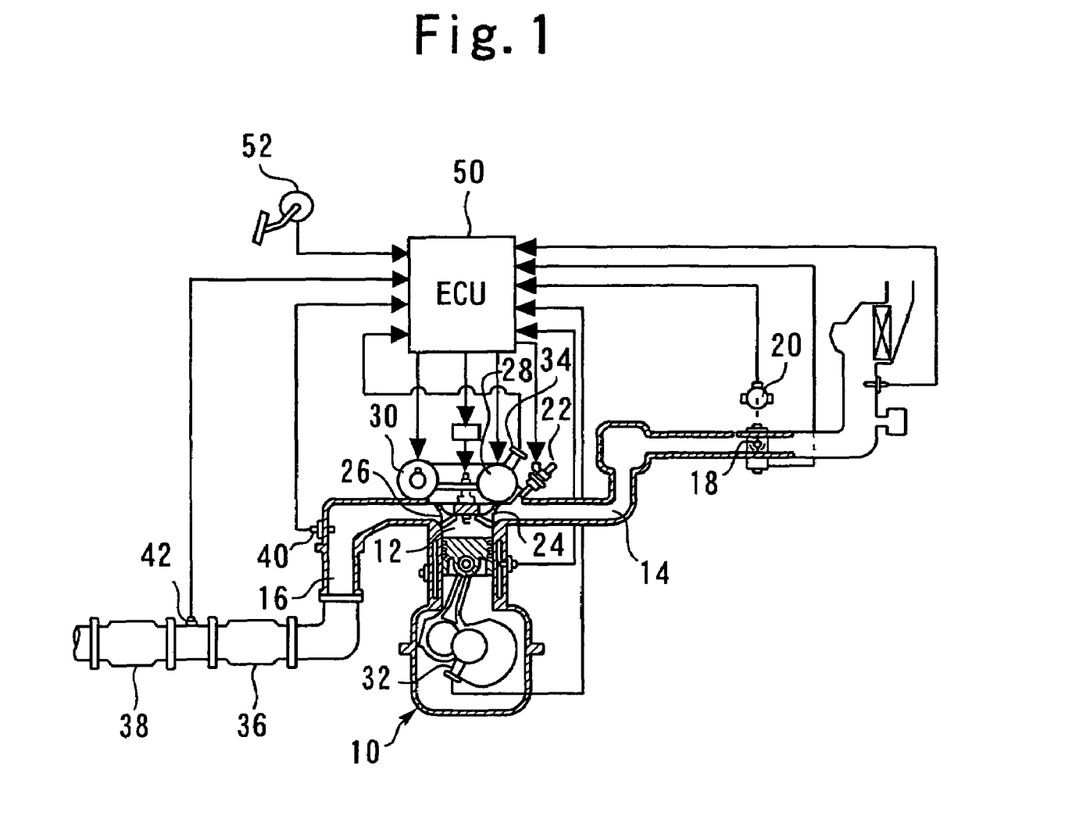
FIG. 1 is a view for illustrating the configuration of a first embodiment of the present invention.

FIG. 1 illustrates the configuration of a first embodiment of the present invention. As shown in FIG. 1, the system according to the present invention includes an internal combustion engine 10. A combustion chamber 12 is formed in a cylinder of the internal combustion engine. The combustion chamber 12 communicates with an intake path 14 and an exhaust path 16.

The intake path 14 is provided with a throttle valve 18. The throttle valve 18 is an electronically controlled valve that is driven by a throttle motor in accordance with the accelerator opening. A throttle position sensor 20 for detecting the throttle opening TA is positioned near the throttle valve 18.

The internal combustion engine 10 is a multiple-cylinder engine, which has a plurality of cylinders. FIG. 1 shows a cross section of one of the plurality of cylinders. Each cylinder contained in the internal combustion engine 10 is provided with an intake port, which is connected to the intake path 14, and an exhaust port, which is connected to the exhaust path 16. The intake port is provided with a fuel injection valve 22, which injects fuel into the intake port. Further, the intake port and exhaust port are provided with an intake valve 24 and an exhaust valve 26, respectively. The intake valve 24 connects the combustion chamber 12 to the intake path 14 or disconnects the combustion chamber 12 from the intake path 14. The exhaust valve 26 connects the combustion chamber 12 to the exhaust path 16 or disconnects the combustion chamber 12 from the exhaust path 16.

The intake valve 24 and the exhaust valve 26 are driven by an intake variable valve (VVT) mechanism 28 and an exhaust variable valve (VVT) mechanism 30, respectively. The variable valve mechanisms 28, 30 can open/close the intake valve 24 and exhaust valve 26 in synchronism with crankshaft rotation, and change their valve opening characteristics (valve opening timing, operating angle, lift amount, etc.).

The internal combustion engine 10 includes a crank angle sensor 32, which is positioned near a crankshaft. The crank angle sensor 32 alternates between a High output and Low output each time the crankshaft rotates through a predetermined angle. The output from the crank angle sensor 32 makes it possible to detect, for instance, the rotary position and rotation speed of the crankshaft as well as the engine speed NE. The internal combustion engine 10 also includes a cam angle sensor 34, which is positioned near an intake camshaft. The cam angle sensor 34 is configured the same as the crank angle sensor 32. The output from the cam angle sensor 34 makes it possible to detect, for instance, the rotary position (advance value) of the intake camshaft.

The exhaust path 16 of the internal combustion engine 10 is provided with an upstream catalyst (SC) 36 and a downstream catalyst (UF) 38. These catalysts are serially arranged to purify an exhaust gas. An air-fuel ratio sensor 40 is positioned upstream of the upstream catalyst 36 to detect an exhaust air-fuel ratio at its own position. An oxygen sensor 42 is positioned between the upstream catalyst 36 and downstream catalyst 38. The oxygen sensor 42 generates a signal that varies depending on whether the air-fuel ratio prevailing at its own position is rich or lean.

The system shown in FIG. 1 includes an ECU (Electronic Control Unit) 50. The ECU 50 is connected to the various above-mentioned sensors, an accelerator position sensor 52 for detecting the accelerator opening PA, and the various above-mentioned actuators. The ECU 50 can control the operating status of the internal combustion engine 10 in accordance with the outputs from the sensors.

[Overview of Catalyst Deterioration Inhibition Control]

If an idle opening TA0 is set as the throttle opening TA during an internal combustion engine operation, the system according to the present embodiment, which is described above, performs a process for stopping fuel injection, that is, a fuel cut-off (FC) process. The fuel cut-off process begins when the throttle opening TA is suddenly reduced during an internal combustion engine operation. After the start of the fuel cut-off process, therefore, the intake pipe pressure PM is likely to become significantly negative. If, in this instance, the intake pipe pressure PM becomes unduly negative, an oil ascent occurs in the internal combustion engine 10, thereby increasing the oil consumption.

It is possible to prevent the intake pipe pressure PM from becoming negative when the throttle opening TA is increased. Therefore, if the throttle opening TA is kept larger than the basic idle opening TA0 after the start of fuel cut-off, it is possible to prevent the intake pipe pressure PM from becoming unduly negative, that is, to avoid an oil ascent. However, fuel injection does not take place during fuel cut-off. Therefore, the gas flowing into the catalysts (upstream catalyst 36 and downstream catalyst 38) is extremely lean. If a lean gas flows into high-temperature catalysts, the catalysts readily deteriorate. Consequently, if the throttle opening TA is enlarged to increase the amount of lean gas distribution after the start of fuel cut-off, it is possible to avoid an increase in the oil consumption; however, the upstream catalyst 36 and downstream catalyst 38 quickly deteriorate.

The system shown in FIG. 1 can extend a valve overlap period, that is, the period during which the intake valve 24 and exhaust valve 26 are both open, by causing the intake variable valve mechanism 28 to advance the valve opening phase of the intake valve 24 (i.e., advance the valve opening timing). When the valve overlap period is extended while fuel is cut off at the time of deceleration with the intake pipe pressure PM rendered negative, the amount of burned gas that flows back to the intake path 14 after the intake valve 24 is opened, that is, the internal EGR amount, increases.

When the amount of gas existing downstream of the throttle valve 18 increases, the intake pipe pressure PM becomes close to the atmospheric pressure. The amount of gas is equal to the sum of the amount of fresh gas passage through the throttle valve 18 and the amount of internal EGR gas generated during the valve overlap period. Therefore, when the internal EGR amount is sufficiently large, the intake pipe pressure PM does not become unduly negative no matter whether the throttle opening TA is small.

As described above, when the throttle opening TA is sufficiently reduced with an adequate valve overlap generated, the system shown in FIG. 1 can generate an adequate amount of internal EGR and effectively inhibit the progress in the deterioration of the upstream catalyst 36 and downstream catalyst 38 while avoiding an oil ascent. Such control, that is, the control exercised to inhibit the deterioration of the catalysts 36, 38 by introducing an EGR gas into the combustion chamber 12 during fuel cut-off at the time of deceleration, is hereinafter referred to as "catalyst deterioration inhibition control during fuel cut-off."

[Features of the First Embodiment]

In general, when recovery (forced recovery) is to be achieved from fuel cut-off in compliance with a driver's acceleration request, the acceleration request is detected in accordance, for instance, with the accelerator opening PA and throttle opening TA to judge that the condition for forced recovery from fuel cut-off is established. When the condition for such forced recovery is established, fuel injection resumes with the throttle opening TA increased to comply with the request from the accelerator pedal.

While the catalyst deterioration inhibition control during fuel cut-off is exercised, the intake variable valve mechanism 28, in which the valve opening phase of the intake valve 24 (which may be hereinafter referred to as the "intake valve timing VVT") is shifted toward the advance side to increase the EGR ratio during fuel cut-off in a situation where the condition for forced recovery from fuel cut-off is established, reverts to a predefined advance value that matches the operating status of the internal combustion engine 10. Under normal conditions, the variable valve mechanisms 28, 30 are hydraulically driven. Therefore, their response is inferior to that of the throttle valve 18. Consequently, when the throttle opening TA increases to comply with the request from the accelerator pedal after the condition for forced recovery is established, the intake variable valve mechanism's control over intake valve timing VVT is retarded in terms of responsiveness from the throttle valve opening control.

When forced recovery from fuel cut-off is to be achieved, the driver may issue a request for acceleration into a low-load region (hereinafter referred to as a "moderate acceleration request"). When a moderate acceleration request is issued, the throttle valve 18 is gradually opened and the degree of its opening is relatively small. Therefore, a relatively small amount of fresh air is introduced into the combustion chamber 12 at the time of recovery from fuel cut-off. Consequently, if fuel injection resumes when a moderate acceleration is requested at the time of forced recovery from fuel cut-off, the amount of fresh air inflow to the combustion chamber 12 and the amount of internal EGR do not decrease sufficiently. As a result, combustion deterioration or misfire occurs.

More specifically, when the aforementioned catalyst deterioration inhibition control during fuel cut-off is exercised, a mixture of fresh air and internal EGR gas moves between the combustion chamber 12 and intake path 14 during fuel cut-off. Therefore, the first combustion after recovery from fuel cut-off is very vigorous. However, the burned gas resulting from the first combustion increases the ratio of the burned gas to the gas that moves between the combustion chamber 12 and intake path 14. As a result, in the combustion during the time interval between the instant at which the second combustion occurs after recovery and the instant at which the advance value for the intake valve timing VVT reverts to a preset value for normal combustion operation, the gas having a high burned gas ratio is taken again into the combustion chamber 12 (back blow). Therefore, combustion deterioration or misfire occurs.

As such being the case, if moderate acceleration is requested when forced recovery is achieved from a situation where the aforementioned catalyst deterioration inhibition control is exercised during fuel cut-off, the system according to the present embodiment prohibits the recovery from fuel cut-off, that is, the resumption of fuel injection, by the time it is judged that the drive amount for the intake variable valve mechanism 28 reverts to a region where combustion is possible.

The details of the process according to the first embodiment will now be described with reference to FIGS. 2 and 3.

Figure 2:
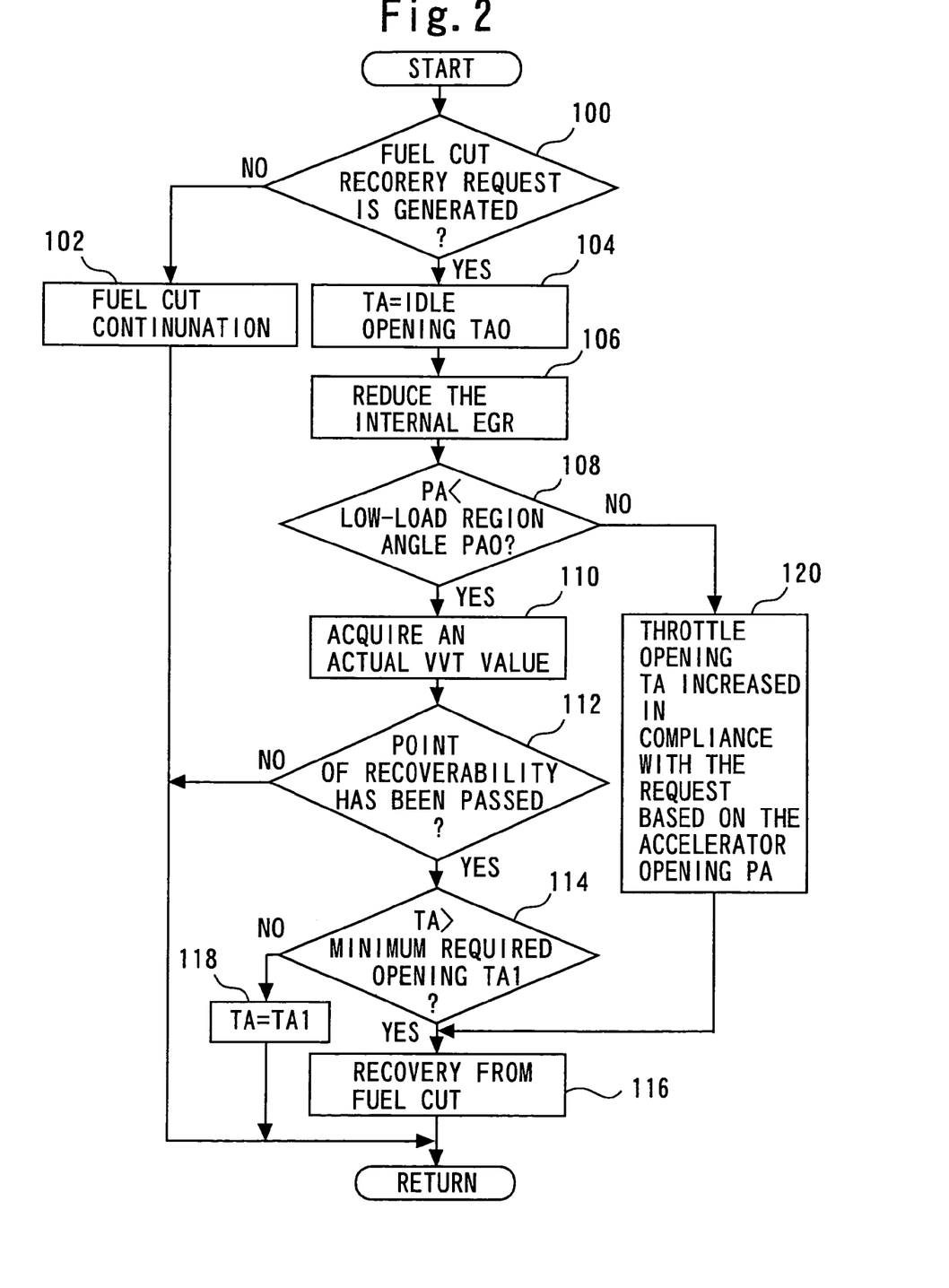
FIG. 2 is a flowchart illustrating a routine that is executed in the first embodiment of the present invention.

FIG. 2 is a flowchart illustrating a routine that the ECU 50 executes to implement the above functionality in accordance with the present embodiment. It is assumed that the routine is periodically executed at predetermined time intervals while the fuel is cut off at the time of deceleration. In the routine shown in FIG. 2, step 100 is performed first to judge whether a fuel cut-off recovery request is generated. More specifically, the accelerator opening PA is judged to determine whether the driver has stepped on the accelerator pedal. If the obtained judgment result indicates that no fuel cut-off recovery request is generated, step 102 is performed to continuously cut off the fuel.

If, on the other hand, the judgment result obtained in step 100 indicates that a fuel cut-off recovery request is generated, that is, the condition for forced recovery from fuel cut-off is established, the idle opening TA0 is set as the throttle opening TA (step 104). Further, the process for reducing the internal EGR is performed by causing the intake variable valve (VVT) mechanism 28 to retard the intake valve timing VVT (step 106). More specifically, when a fuel cut-off recovery request is recognized, the advance value for the intake valve timing VVT immediately reverts to a preset value for normal combustion operation in accordance with the operating status of the internal combustion engine 10. The system according to the present embodiment exercises the aforementioned catalyst deterioration inhibition control. Therefore, while the fuel is cut off, the throttle opening TA is basically reduced to zero in order to properly restrain the fresh air inflow to the catalysts 36, 38. When a request for recovering from fuel cut-off is recognized, according to the process of step 104, the throttle opening TA of the throttle valve 18, which is more responsive than the intake variable valve mechanism 28, is set for the idle opening TA0. Therefore, steps 104 and 106 are performed to prevent the intake pipe pressure PM from becoming unduly negative when the intake valve timing VVT is retarded.

Next, step 108 is performed to judge whether the accelerator opening PA is smaller than a predetermined low-load region angle PA0. More specifically, step 108 judges the degree of requested acceleration in accordance with the degree of accelerator pedal depression. In other words, step 108 is followed to judge whether moderate acceleration is requested by the driver. Here, it is assumed that the amount of a change in the accelerator opening PA (accelerator depression amount) is compared against the low-load region angle PA0, which is a threshold value. However, the present invention is not limited to the use of such a method of judging the degree of requested acceleration. Alternatively, the degree of requested acceleration may be judged from the rate of a change in the accelerator opening PA (accelerator depression speed) instead of the amount of a change in the accelerator opening PA or in addition to the accelerator opening PA.

If the judgment result obtained in step 108 indicates that the accelerator opening PA is smaller than the low-load region angle PA0, that is, moderate acceleration is requested, step 110 is performed to acquire an actual VVT value, which is a real value of the intake valve timing VVT. The aforementioned cam angle sensor 34 detects the actual VVT value on each predefined processing cycle.

Next, step 112 is performed to judge whether the actual VVT value has passed a point of recoverability. More specifically, step 112 is followed to judge whether the actual VVT value is retarded to the value L, which permits combustion after recovery from fuel cut-off. To perform such a judgment step, the ECU 50 stores a map that defines the relationship among a combustion assurance VVT value L, the engine speed NE, and a requested load factor KL (the relationship of the combustion assurance VVT value L to the operating status of the internal combustion engine 10), as shown in FIG. 3.

Figure 3:
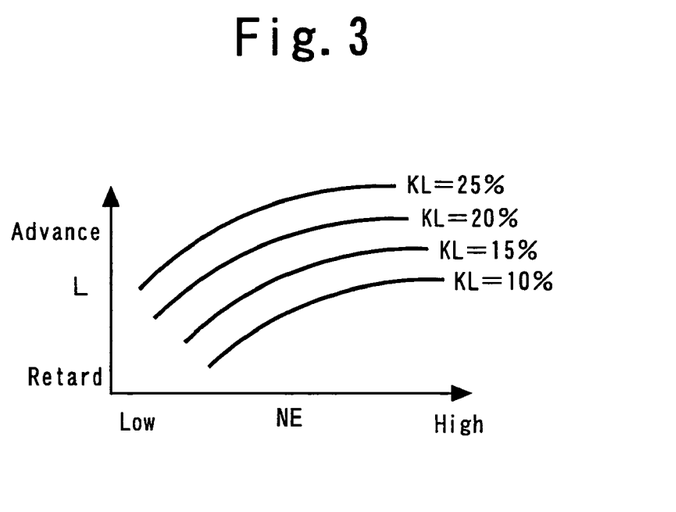
FIG. 3 is an example of a map of the combustion assurance VVT value L referred in the routine shown in FIG. 2.

In FIG. 3, the combustion assurance VVT value L indicates the advance value for the intake valve timing VVT. In the internal combustion engine 10, the higher the engine speed NE and the higher the actual load factor KL, the higher the misfire limit. Therefore, the map shown in FIG. 3 is formulated so that the combustion assurance VVT value L, which is the advance value for the intake valve timing VVT that satisfies the misfire limit, increases with an increase in the engine speed NE and with an increase in the requested load factor KL. Performing step 112 to judge whether the actual VVT value is retarded to the combustion assurance VVT value L is to judge whether the EGR ratio prevailing in the combustion chamber 12 is decreased to permit combustion.

If the judgment result obtained in step 112 does not indicate that the combustion assurance VVT value L (the point of recoverability) is reached by the actual VVT value L, the current processing cycle immediately terminates. If, on the other hand, the obtained judgment result indicates that the combustion assurance VVT value is reached by the actual VVT value, step 114 is performed to judge whether the throttle opening TA is not smaller than a minimum required opening TA1. More specifically, step 114 is followed to judge whether the throttle opening TA is not smaller than the opening TA1 for resuming fuel injection without causing a misfire. This judgment step is performed in order to achieve prompt recovery from fuel cut-off when the combustion assurance VVT value L is reached by the actual VVT value. The minimum required opening TA1 is calculated by referencing a map (not shown) that defines its relationship to the operating status of the internal combustion engine 10 (engine speed NE, etc.).

Step 104 is performed to set the idle opening TA0 as the throttle opening TA. Therefore, step 114 is substantially performed to compare the idle opening TA0 against the minimum required opening TA1. If the idle opening TA0 is not smaller than the minimum required opening TA1 and the opening TA1 required for fuel injection resumption is provided due to the use of the idle opening TA0, step 116 is performed next because the condition specified in step 114 is established. If, on the other hand, the idle opening TA0 is smaller than the minimum required opening TA1, that is, it is judged that the idle opening TA0 is inadequate for fuel injection resumption, step 118 is performed to set the minimum required opening TA1 as the throttle opening TA.

If the judgment result obtained in step 114 indicates that the throttle opening TA is not smaller than the minimum required opening TA1, step 116 is performed to achieve recovery from fuel cut-off. More specifically, fuel injection resumes.

If, on the other hand, the judgment result obtained in step 108 does not indicate that moderate acceleration is requested, step 120 is performed to increase the throttle opening TA as needed to comply with the request based on the accelerator opening PA (step 120). Next, step 116 is performed to achieve recovery from fuel cut-off.

As described above, the routine shown in FIG. 2 prohibits the recovery from fuel cut-off, that is, the resumption of fuel injection, until the intake valve timing VVT is retarded to a value that permits combustion resumption. In other words, the routine sufficiently attenuates the internal EGR until combustion can resume, and then performs a process for recovering from fuel cut-off. In a situation where the aforementioned catalyst deterioration inhibition control during fuel cut-off is exercised, therefore, the system according to the present embodiment can avoid the occurrence of combustion deterioration or misfire when forced recovery from fuel cut-off is achieved for moderate acceleration.

Further, when the condition for forced recovery from fuel cut-off is established for moderate acceleration, the routine shown in FIG. 2 does not immediately start to gradually open the throttle valve 18, but maintains the idle opening TA0 as the throttle opening TA until the intake valve timing VVT is retarded to a value that permits combustion resumption. Therefore, the system according to the present embodiment can prevent the fresh air that is not subjected to combustion from flowing into the catalysts 36, 38 before fuel injection resumption, thereby inhibiting the catalysts 36, 38 from deteriorating.

Figure 4A:
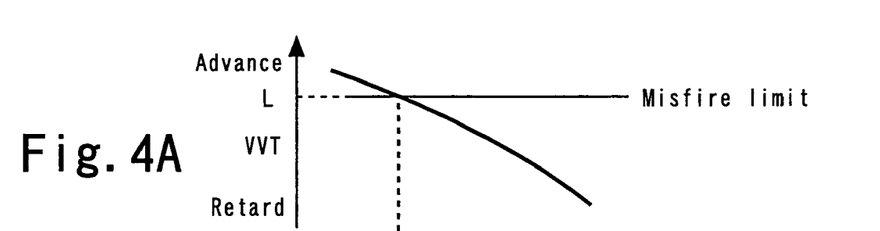
FIGS. 4(A) and 4(B) are timing diagrams illustrating the relationship between the throttle opening changes based on the accelerator opening PA and the changes in the intake valve timing VVT.
Figure 4B:
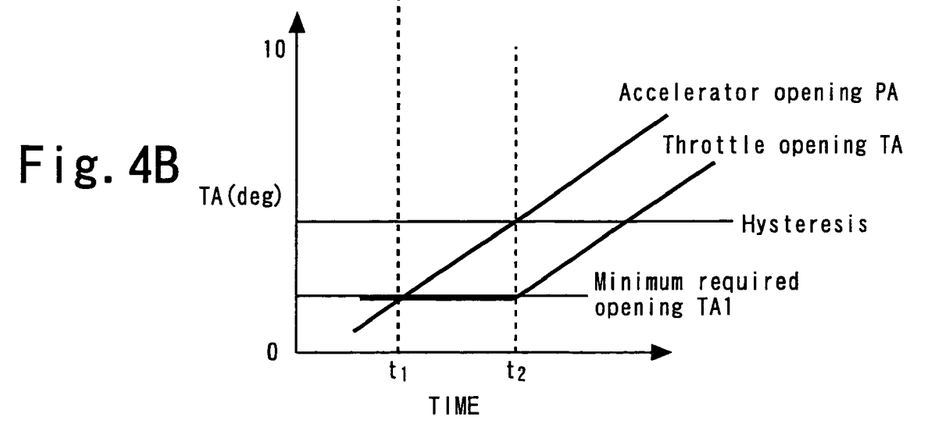

The routine shown in FIG. 2 achieves recovery from fuel cut-off when the intake valve timing VVT permits combustion resumption. Therefore, it provides excellent advantages in a situation described below. The advantages will now be described in detail with reference to FIGS. 4 and 5. FIGS. 4A and 4B are timing diagrams illustrating the relationship between the throttle opening changes based on the accelerator opening PA and the changes in the intake valve timing VVT. More specifically, FIG. 4A shows the changes in the intake valve timing VVT, whereas FIG. 4B shows throttle opening changes based on the accelerator opening PA.

The throttle opening TA is controlled by instructions issued by the ECU 50 in accordance with accelerator opening changes detected by an accelerator position sensor 54.

As indicated in FIG. 4A, predefined hysteresis is usually given to throttle valve opening control so that a dead zone is provided for the ECU's instructions based on the accelerator opening PA. Consequently, when a moderate acceleration request is generated, for instance, by depressing the accelerator pedal very moderately, time t2 at which the accelerator pedal is depressed to the hysteresis of the throttle opening TA can be later than time t1 at which the actual VVT value reaches the combustion assurance VVT value L as indicated in FIG. 4B.

If, in the above instance, the process for recovering from fuel cut-off is initiated when the throttle opening TA reaches a predetermined value, recovery from fuel cut-off is not achieved until the hysteresis of the throttle opening TA is exceeded no matter whether the intake valve timing VVT is retarded to value that can avoid a misfire. Consequently, since the idle opening TA0 is employed as the throttle opening TA when the moderate acceleration request is detected, fresh air that is not subjected to combustion flows to deteriorate the catalysts 36, 38 before the hysteresis of the throttle opening TA is exceeded.

Figure 5A:
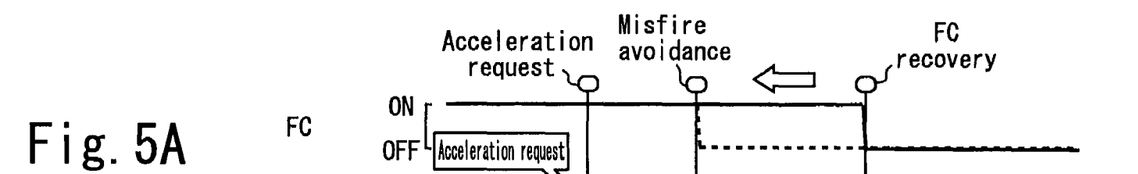
FIGS. 5A to 5F are timing diagrams illustrating the operations of various elements involved in the routine shown in FIG. 2.
Figure 5B:
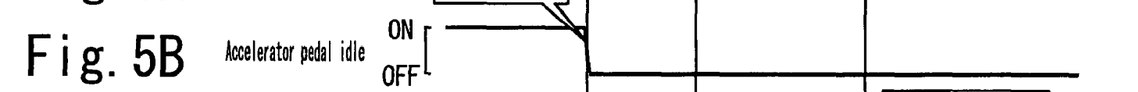
Figure 5C:
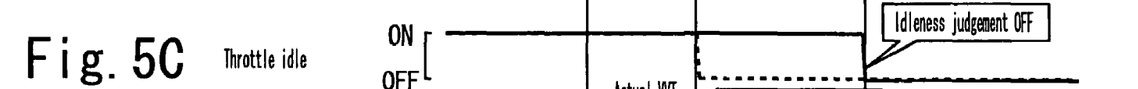
Figure 5D:
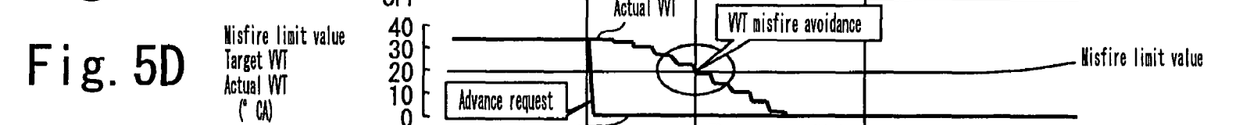
Figure 5E:
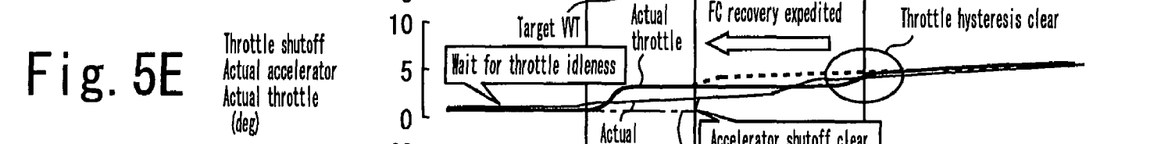
Figure 5F:
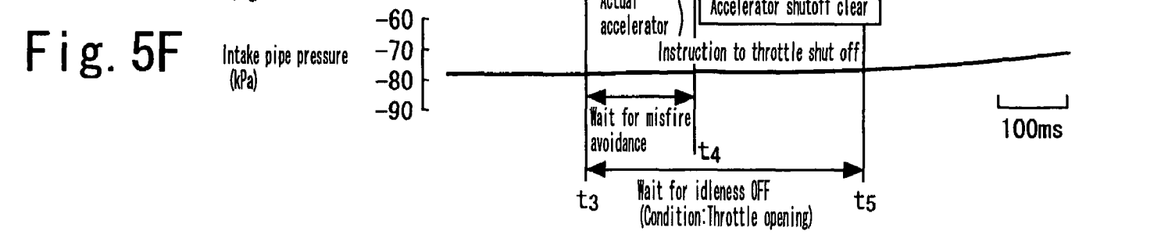

FIGS. 5A to 5F are timing diagrams illustrating the operations of various elements involved in the routine shown in FIG. 2. More specifically, FIG. 5A shows a waveform that indicates whether fuel cut-off is successful. FIG. 5B shows a waveform that indicates whether the accelerator pedal is in the idle position. FIG. 5C shows a waveform that indicates whether the throttle valve 18 is in the idle position. FIG. 5D illustrates typical fuel-cut-off-induced changes in the target VVT value and actual VVT value in relation to a misfire limit value. FIG. 5E shows typical fuel-cut-off-induced changes in the actual accelerator opening PA (for moderate acceleration) and actual throttle opening TA. FIG. 5F shows typical changes in the intake pipe pressure PM. The waveforms depicted in broken lines in FIGS. 5A, 5C, and 5E indicate the differences between the method used by the routine shown in FIG. 2 and the method for judging the start of recovery from fuel cut-off in accordance with the throttle opening TA.

When an acceleration request (time t3) is detected in accordance with the accelerator opening PA (see FIG. 5B), the routine shown in FIG. 2 sets the idle opening TA0 as the actual throttle opening TA (see FIG. 5E), and issues a request for retarding the intake valve timing VVT (see FIG. 5D). When the actual VVT value reaches the misfire limit value (combustion assurance VVT value L) at time t4, the routine achieves recovery from fuel cut-off. In this instance, the request for increasing the throttle opening TA is blocked as indicated by a waveform depicted in a one-dot chain line in FIG. 5E until time t4 is reached.

When the method for judging the start of recovery from fuel cut-off in accordance with the throttle opening TA is used, the throttle valve idleness judgment turns OFF at time t5 at which the actual accelerator opening PA exceeds the hysteresis of the throttle opening TA, thereby achieving recovery from fuel cut-off, as indicated in FIGS. 5A and 5B. On the other hand, when the method of the routine shown in FIG. 2 is employed, recovery from fuel cut-off is achieved at time t4 as indicated by a waveform depicted in a broken line in FIG. 5A. Since the throttle opening TA increases to provide the aforementioned minimum required opening TA1 at time t4 as indicated by a waveform depicted in a broken line in FIG. 5E, the throttle valve idleness judgment turns OFF accordingly at time t4 as indicated by a waveform depicted in a broken line in FIG. 5C.

When the method for judging the start of recovery from fuel cut-off in accordance with the throttle opening TA is used, the recovery wait time is between time t3 at which the moderate acceleration request is detected and time t5 at which the throttle valve idleness judgment turns OFF (t5–t3), as indicated in FIGS. 5A to 5F. However, when the method of the routine shown in FIG. 2 is used, the recovery wait time is between time t3 and time t4 at which the actual VVT value reaches the misfire limit value (t4–t3). Therefore, the system according to the present embodiment can produce an enhanced effect of inhibiting the catalysts 36, 38 from deteriorating as it burns the fresh air supplied to the combustion chamber 12 during the time interval between time t4 and time t5, that is, between the instant at which recovery from fuel cut-off starts and the instant at which the actual accelerator opening PA exceeds the hysteresis of the throttle opening TA (the period during which throttle opening control is slowed down).

The first embodiment, which has been described above, changes the status of the intake variable valve mechanism 28 to change the valve overlap period, thereby changing the internal EGR amount. However, the present invention is not limited to the use of such an internal EGR amount change method. For example, the exhaust variable valve mechanism 30 may alternatively be changed to change the valve overlap period, thereby changing the internal EGR amount.

The method for changing the internal EGR amount is not limited to the method of increasing/decreasing the valve overlap period. If, for instance, a crank angle region before the exhaust top dead center is set as the valve closing timing for the exhaust valve 26, the amount of residual gas that is confined in the combustion chamber 12 during an exhaust stroke increases/decreases when the valve closing timing is varied. Therefore, the internal EGR amount may alternatively be increased/decreased by adjusting the exhaust valve closing timing within a crank angle region before the exhaust top dead center.

The first embodiment, which has been described above, assumes that the process performed by the routine shown in FIG. 2 is applied to the hardware shown in FIG. 1. However, the present invention is not limited to the use of such a hardware configuration. For example, the hardware configuration shown in FIG. 6 may alternatively be used.

Figure 6:
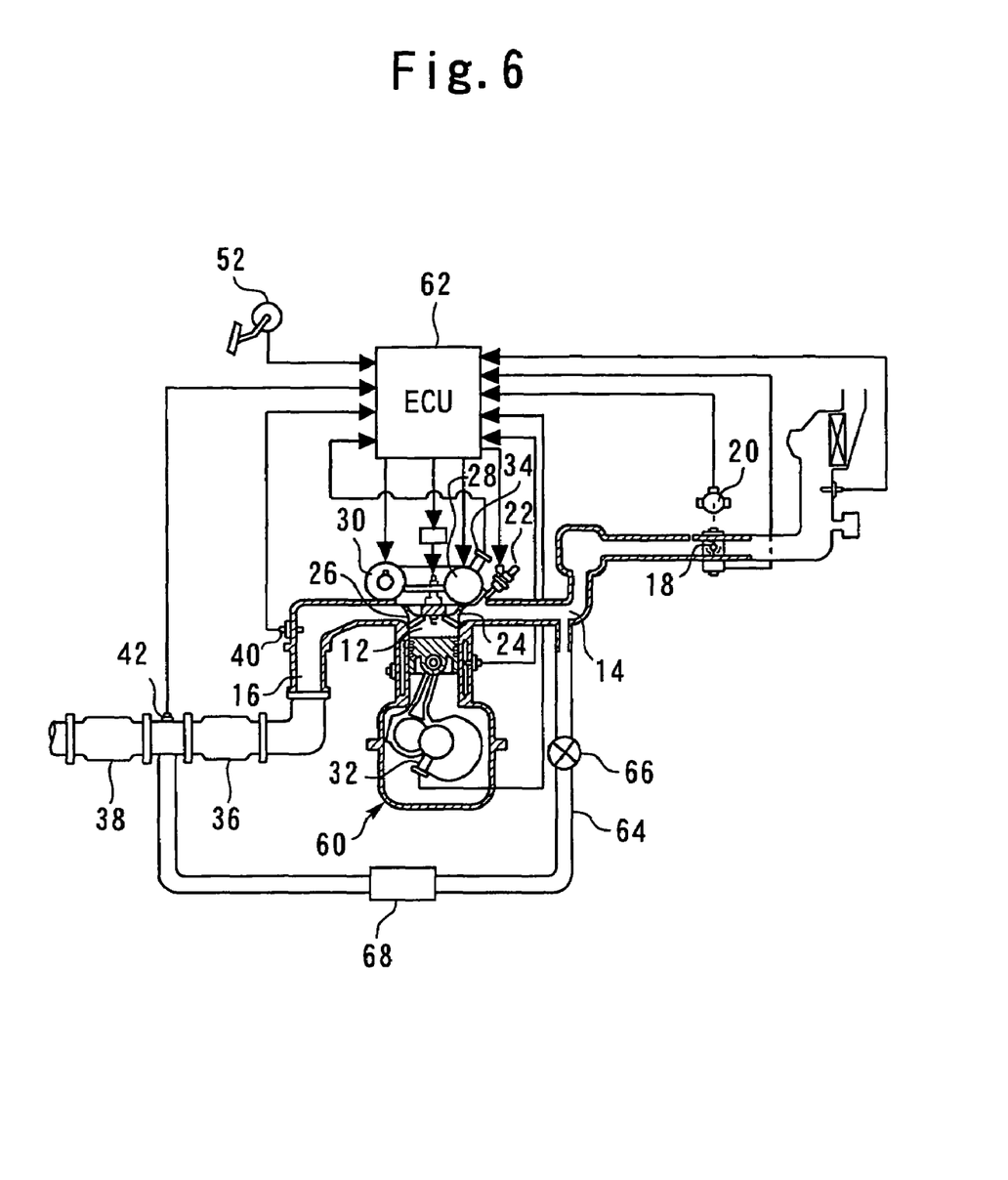
FIG. 6 illustrates the configuration of a modified embodiment of the present invention.

FIG. 6 illustrates the configuration of a modified embodiment. As regards the elements in FIG. 6 that are the same as those in FIG. 1, their description is omitted or abridged with the same reference numerals assigned. The system for an internal combustion engine 60 that is shown in FIG. 6 includes not only the intake variable valve (VVT) mechanism 28 and exhaust variable valve (VVT) mechanism 30 as a configuration for exercising internal EGR control, but also an exhaust gas back-flow path 64, which communicates with the intake path 14 and exhaust path 16 as a configuration for exercising external EGR control. The exhaust gas back-flow path 64 is provided with an exhaust gas back-flow valve (EGR valve) 66. A desired amount of exhaust gas can be flowed back to the combustion chamber 12 via the intake path 14 by adjusting the opening of the EGR valve 66 as appropriate. The exhaust gas back-flow path 64 is also provided with an exhaust gas cooling apparatus (EGR cooler) 68, which uses engine cooling water to cool the exhaust gas that flows back to the intake path 14. The present invention may alternatively be implemented by employing the hardware shown in FIG. 6 and allowing an ECU 62 to execute the routine shown in FIG. 2.

In the first embodiment, which has been described above, the "fuel cut-off means" according to the first aspect of the present invention is implemented when the ECU 50 performs a fuel cut-off process at the time of internal combustion engine deceleration; the "EGR control means" according to the first aspect of the present invention is implemented when the ECU 50 drives the intake variable valve mechanism 28 to control the internal EGR amount; the "forced recovery condition judgment means" according to the first aspect of the present invention is implemented when the ECU 50 performs step 100; the "degree-of-requested-acceleration judgment means" according to the first aspect of the present invention is implemented when the ECU 50 performs step 108; the "combustibility judgment means" according to the first aspect of the present invention is implemented when the ECU 50 performs steps 110, 112, and 114; and the "fuel injection resumption means" according to the first aspect of the present invention is implemented when the ECU 50 performs step 116.

Further, in the first embodiment, which has been described above, the "variable valve timing control means" according to the fifth aspect of the present invention is implemented when the ECU 50 drives the intake variable valve mechanism 28 to increase/decrease the internal EGR amount.

Second Embodiment

A second embodiment of the present invention will now be described with reference to FIG. 7.

Figure 7:
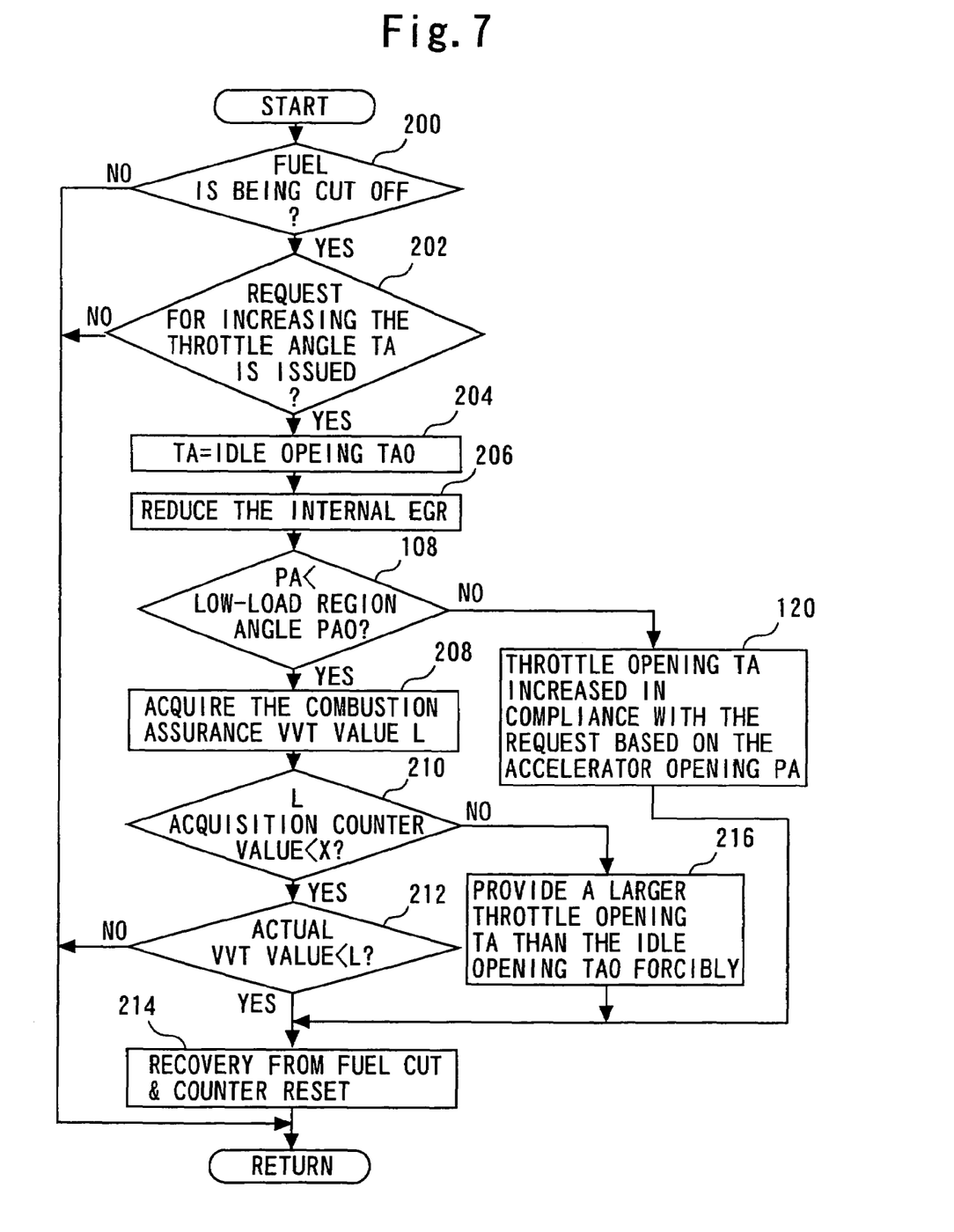
FIG. 7 is a flowchart illustrating a routine that is executed in the second embodiment of the present invention.

The system according to the second embodiment is implemented by adopting the hardware configuration shown in FIG. 1 and allowing the ECU 50 to execute a routine shown in FIG. 7 instead of the routine shown in FIG. 2.

The system according to the present embodiment also prohibits the recovery from fuel cut-off in order to inhibit the occurrence of combustion deterioration and the like until the intake valve timing VVT is retarded to the combustion assurance VVT value L no matter whether the condition for forced recovery from fuel cut-off is established. However, if combustion does not resume in a situation where an acceleration request is issued by the driver, the response to the acceleration request deteriorates. When a predetermined period of time elapses after acceleration request detection, therefore, the system according to the present embodiment achieves recovery from fuel cut-off by forcibly providing a larger throttle opening TA than the idle opening TA0 even if the combustion assurance VVT value L is still not reached by the intake valve timing VVT.

The process performed in the second embodiment will now be described in detail with reference to FIG. 7.

FIG. 7 is a flowchart illustrating a routine that the ECU 50 executes to implement the above functionality in accordance with the present embodiment. The routine is periodically executed at predetermined time intervals. As regards the steps in FIG. 7 that are the same as those in FIG. 2, which illustrates the first embodiment, their description is omitted or abridged with the same reference numerals assigned.

In the routine shown in FIG. 7, step 200 is performed first to judge whether fuel is being cut off at the time of deceleration. If the obtained judgment result indicates that the fuel is being cut off, step 202 is performed to judge whether a request for increasing the throttle opening TA is issued. More specifically, the accelerator opening PA is judged to determine whether the accelerator pedal is depressed by the driver.

If the judgment result obtained in step 202 indicates that a request for increasing the throttle opening TA is issued, that is, the condition for forced recovery from fuel cut-off is established, step 204 is performed to set the idle opening TA0 as the throttle opening TA. Further, step 206 is performed to attenuate the internal EGR, which was conducted during fuel cut-off. More specifically, step 206 initiates a process for restoring the advance value for the intake valve timing VVT to a preset value according to the operating status of the internal combustion engine 10.

Next, step 108 is performed to judge whether the acceleration request issued by the driver is a moderate acceleration request. If the obtained judgment result indicates that a moderate acceleration request is issued, step 208 is performed to acquire the combustion assurance VVT value L. The combustion assurance VVT value L can be acquired by referencing a map that is similar to the one shown in FIG. 3.

Next, step 210 is performed to judge whether a combustion assurance VVT value L acquisition counter value is smaller than a predetermined value X. The value X is predetermined as a limit value for the combustion assurance VVT value L acquisition count in order to prevent the response to an acceleration request from deteriorating. If the predetermined value X is not exceeded by the combustion assurance VVT value L acquisition counter value, step 212 is performed to judge whether the actual VVT value is smaller than the combustion assurance VVT value L.

If it is recognized in step 212 that the actual VVT value is smaller than the combustion assurance VVT value L, step 214 is performed to achieve recovery from fuel cut-off and reset the combustion assurance VVT value L acquisition counter to zero. More specifically, fuel injection resumes with the throttle opening TA increased in compliance with the request based on the accelerator opening PA.

If, on the other hand, the judgment result obtained in step 210 indicates that the combustion assurance VVT value L acquisition counter value is greater than the predetermined value X, that is, a predetermined period of time has elapsed since the generation of the acceleration request, step 216 is performed to forcibly provide a larger throttle opening TA than the idle opening TA0. In addition, step 214 is performed to resume fuel injection.

As described above, the routine shown in FIG. 7 can avoid the occurrence of combustion deterioration or misfire at the time of forced recovery from fuel cut-off for moderate acceleration in a situation where the aforementioned catalyst deterioration inhibition control during fuel cut-off is exercised. The routine can also prevent the response to a driver's acceleration request from deteriorating. Consequently, the routine shown in FIG. 7 can avoid drivability deterioration.

The second embodiment, which has been described above, assumes that the process performed by the routine shown in FIG. 7 is applied to the hardware shown in FIG. 1. However, the present invention is not limited to the use of such a hardware configuration. As is the case with the first embodiment, the second embodiment may alternatively be implemented by adopting the hardware shown in FIG. 6 and allowing the ECU 62 to execute the routine shown in FIG. 7.

In the second embodiment, which has been described above, the "throttle opening increase prohibition means" according to the third aspect of the present invention is implemented when the ECU 50 performs step 214 in a situation where it is judged in steps 108, 208, and 212 that combustion can be resumed.

Third Embodiment

A third embodiment of the present invention will now be described with reference to FIGS. 8 and 9.

Figure 8:
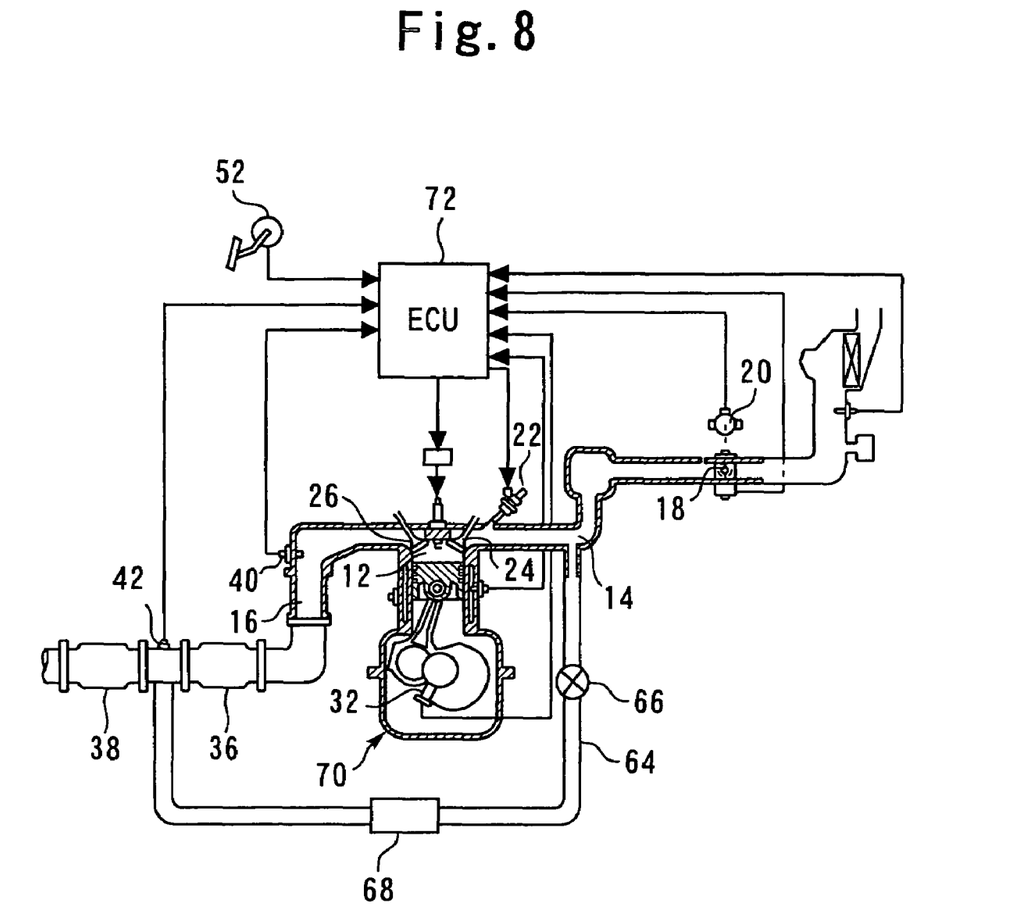
FIG. 8 is a view for illustrating the configuration of a third embodiment of the present invention.

FIG. 8 illustrates the configuration of the third embodiment of the present invention. As regards the elements in FIG. 8 that are the same as those in FIG. 1, their description is omitted or abridged with the same reference numerals assigned.

The system for an internal combustion engine 70 that is shown in FIG. 8 is similar in configuration to the system shown in FIG. 1 except that the former includes an exhaust gas back-flow path 64, an exhaust gas back-flow valve (EGR valve) 66, and an exhaust gas cooling apparatus (EGR cooler) 68, and allows valve mechanisms (not shown) to open/close the intake valve 24 and exhaust valve 26 in such a manner as to exhibit individual valve opening characteristics.

If, in the system according to the present embodiment in which the aforementioned external EGR control is exercised, moderate acceleration is requested at the time of forced recovery from catalyst deterioration inhibition control during fuel cut-off and fuel injection resumes in a situation where the external EGR amount is not sufficiently decreased by adjusting the opening of the EGR valve 66, combustion deterioration or misfire occurs as is the case where internal EGR control is exercised. When such a moderate acceleration request is generated, therefore, the present embodiment prohibits the recovery from fuel cut-off until the opening of the EGR valve 66 is restored to a region where combustion is judged to be possible.

The process performed in the third embodiment of the present invention will now be described in detail with reference to FIG. 9.

Figure 9:
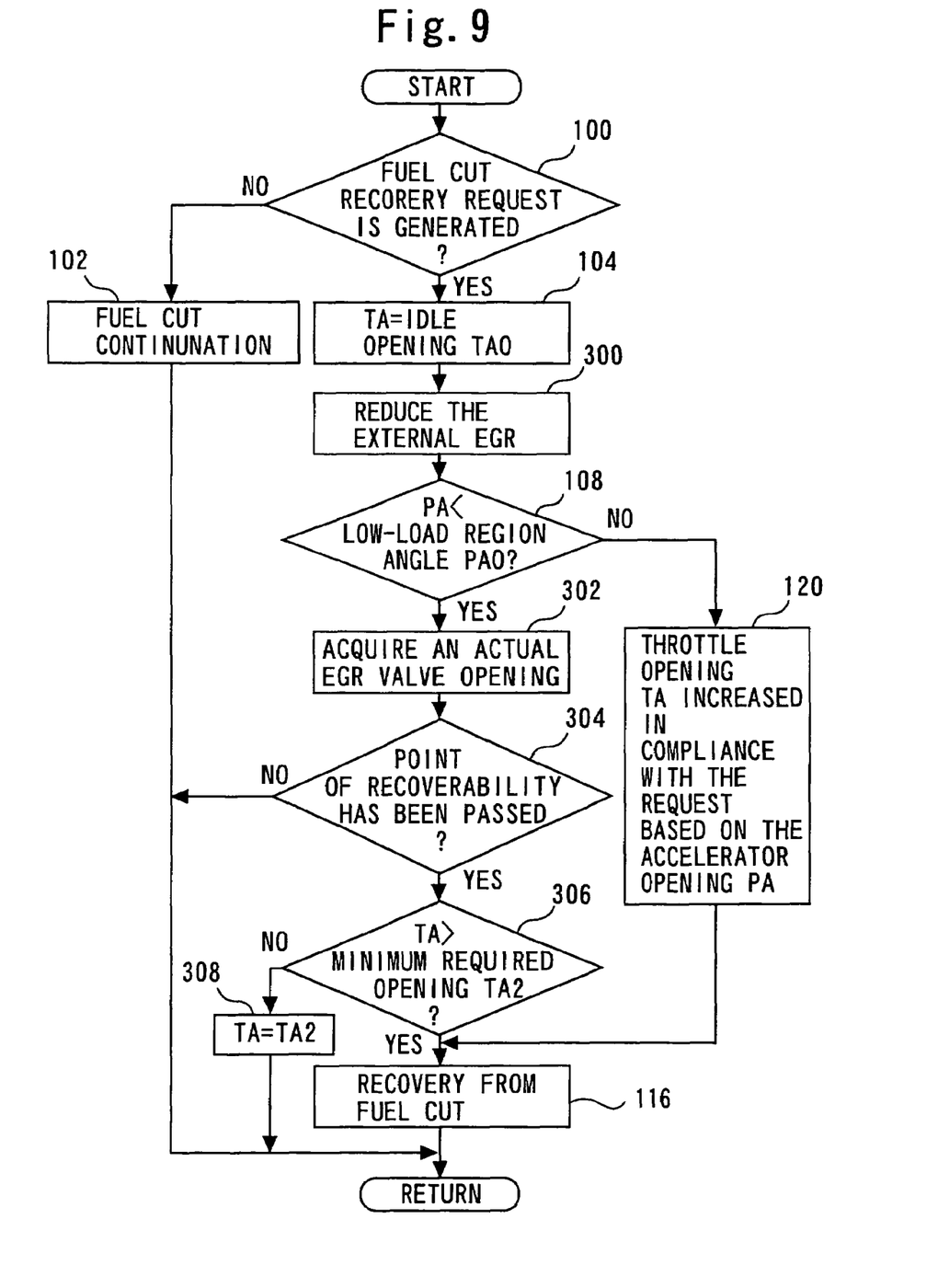
FIG. 9 is a flowchart illustrating a routine that is executed in the third embodiment of the present invention.

FIG. 9 is a flowchart illustrating a routine that an ECU 72 executes in accordance with the present embodiment. The routine is periodically executed at predetermined time intervals while fuel is cut off at the time of deceleration. As regards the steps in FIG. 9 that are the same as those in FIG. 2, which illustrates the first embodiment, their description is omitted or abridged with the same reference numerals assigned.

In the routine shown in FIG. 9, step 100 is performed first to judge whether a fuel cut-off recovery request is issued. If the obtained judgment result indicates that a fuel cut-off recovery request is issued, step 104 is performed to set the idle opening TA0 as the throttle opening TA. In addition, step 300 is performed to attenuate the external EGR, which was conducted during fuel cut-off. More specifically, step 300 initiates a process for restoring the opening of the EGR valve 66 to a preset value according to the operating status of an internal combustion engine 70.

Next, step 108 is performed to judge whether moderate acceleration is requested by the driver. If the judgment result obtained in step 108 indicates that moderate acceleration is requested by the driver, step 302 is performed to acquire the actual EGR valve opening, which is the actual opening value of the EGR valve 66. Next, step 304 is performed to judge whether the actual EGR valve opening has passed the point of recoverability. More specifically, step 304 is performed to judge whether the actual EGR valve opening is reduced to the value M that permits combustion after recovery from fuel cut-off. The combustion assurance EGR valve opening M is defined in relation to the engine speed NE and requested load factor KL (in relation to the operating status of the internal combustion engine 70) as is the case with the aforementioned combustion assurance VVT value L. The ECU 72 can acquire the combustion assurance EGR valve opening M by referencing a map that is similar to the one shown in FIG. 3.

If the judgment result obtained in step 304 indicates that the combustion assurance EGR valve opening M is reached by the actual EGR valve opening, step 306 is performed to judge whether the throttle opening TA is increased to the minimum required opening TA2. The minimum required opening TA2 is calculated by referencing a map (not shown) that is defined in relation to the operating status (engine speed NE, etc.) of the internal combustion engine 70 as is the case with the aforementioned minimum required opening TA1.

If the judgment result obtained in step 306 does not indicate that the throttle opening TA is increased to the minimum required opening TA2, step 308 is performed to exercise control so that the throttle opening TA is increased to the minimum required opening TA2. If, on the other hand, the obtained judgment result indicates that the throttle opening TA is increased to the minimum required opening TA2, step 116 is performed to achieve recovery from fuel cut-off.

As described above, the routine shown in FIG. 9 prohibits the recovery from fuel cut-off, that is, the resumption of fuel injection, until the opening of the EGR valve 66 changes to permit the resumption of combustion. In a situation where external EGR control is maintained to exercise the aforementioned catalyst deterioration inhibition control during fuel cut-off, therefore, the system according to the present embodiment can avoid the occurrence of combustion deterioration or misfire at the time of forced recovery from fuel cut-off for moderate acceleration.

Further, when the condition for forced recovery from fuel cut-off is established for moderate acceleration, the routine shown in FIG. 9 does not immediately start opening the throttle valve 18 in a gradual manner, but maintains the idle opening TA0 as the throttle opening TA until the opening of the EGR valve 66 is retarded to a value that permits the resumption of combustion. Therefore, the system according to the present embodiment can prevent the fresh air that is not subjected to combustion from flowing into the catalysts 36, 38 before the resumption of fuel injection, thereby inhibiting the catalysts 36, 38 from deteriorating.

The third embodiment, which has been described above, assumes that the process performed by the routine shown in FIG. 9 is applied to the hardware shown in FIG. 8. However, the present invention is not limited to the use of such a hardware configuration. For example, the third embodiment may alternatively be implemented by adopting the hardware shown in FIG. 6 and allowing the ECU 62 to execute the routine shown in FIG. 9.

In the third embodiment, which has been described above, the "EGR valve control means" according to the fifth aspect of the present invention is implemented when the ECU 72 adjusts the opening of the EGR control valve 66 to increase/decrease the external EGR amount.

Fourth Embodiment

A fourth embodiment of the present invention will now be described with reference to FIG. 10.

Figure 10:
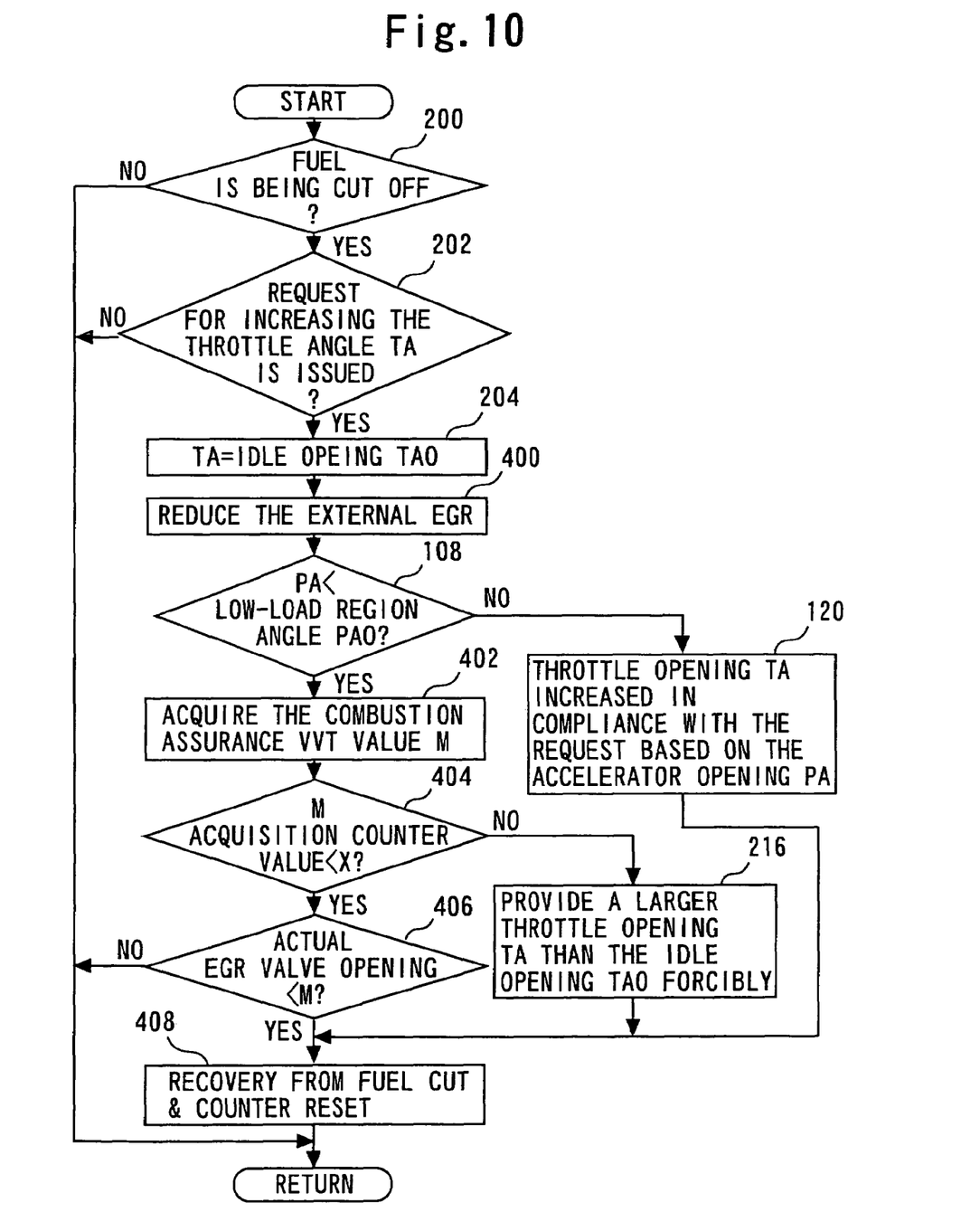
FIG. 10 is a flowchart illustrating a routine that is executed in the fourth embodiment of the present invention.

The system according to the fourth embodiment is implemented by adopting the hardware configuration shown in FIG. 8 and allowing the ECU 72 to execute a routine shown in FIG. 10 instead of the routine shown in FIG. 9.

FIG. 10 is a flowchart illustrating a routine that the ECU 72 executes in accordance with the fourth embodiment. The routine is periodically executed at predetermined time intervals. As regards the steps in FIG. 10 that are the same as those in FIG. 9, which illustrates the second embodiment, their description is omitted or abridged with the same reference numerals assigned.

If, in the routine shown in FIG. 10, the condition for forced recovery is established during fuel cut-off at the time of deceleration (step 202), the idle opening TA0 is set as the throttle opening TA (step 204). In addition, step 400 is performed to initiate a process for restoring the opening of the EGR valve 66 to a preset value according to the operating status of an internal combustion engine 70 with a view toward attenuating the external EGR, which was conducted during fuel cut-off.

Next, if it is judged in step 108 that moderate acceleration is requested by the driver, step 402 is performed to acquire the combustion assurance EGR valve opening M. As is the case with step 304, the combustion assurance EGR valve opening M can be acquired by referencing a map that is similar to the one shown in FIG. 3.

Next, if it is judged in step 404 that the predetermined value X is not exceeded by the combustion assurance EGR valve opening M acquisition counter value, step 406 is performed to judge whether the actual EGR valve opening is smaller than the combustion assurance EGR valve opening M. If the obtained judgment result indicates that the actual EGR valve opening is smaller than the combustion assurance EGR valve opening M, step 408 is performed to achieve recovery from fuel cut-off and reset the combustion assurance EGR valve opening M acquisition counter to zero. More specifically, fuel injection resumes with the throttle opening TA increased to a value that complies with the request based on the accelerator opening PA.

If, on the other hand, the judgment result obtained in step 404 indicates that the combustion assurance EGR valve opening M acquisition counter value is greater than the predetermined value X, that is, a predetermined period of time has elapsed since the issuance of the acceleration request, step 216 is performed to forcibly provide a larger throttle opening TA than the idle opening TA0. In addition, step 408 is performed to resume fuel injection.

As described above, the routine shown in FIG. 10 can avoid the occurrence of combustion deterioration or misfire at the time of forced recovery from fuel cut-off for moderate acceleration in a situation where external EGR control is maintained to exercise the aforementioned catalyst deterioration inhibition control during fuel cut-off. The routine can also prevent the response to a driver's acceleration request from deteriorating. Consequently, the routine shown in FIG. 10 can avoid drivability deterioration.

The fourth embodiment, which has been described above, assumes that the process performed by the routine shown in FIG. 10 is applied to the hardware shown in FIG. 8. However, the present invention is not limited to the use of such a hardware configuration. For example, the fourth embodiment may alternatively be implemented by adopting the hardware shown in FIG. 6 and allowing the ECU 62 to execute the routine shown in FIG. 10.

The invention claimed is:

1. An internal combustion engine control apparatus having fuel cut-off means for cutting off fuel at the time of internal combustion engine deceleration and EGR control means for controlling the amount of exhaust gas recirculation, wherein the EGR control means is capable of varying the amount of exhaust gas recirculation into a combustion chamber while fuel is cut off at the time of deceleration, the internal combustion engine control apparatus comprising:

forced recovery condition judgment means for judging according to an acceleration request detected during fuel cut-off at the time of deceleration that the condition for forced recovery from the fuel cut-off is established;

degree-of-requested-acceleration judgment means for judging the degree of requested acceleration in accordance with the acceleration request; and combustibility judgment means, which, when the degree-of-requested-acceleration judgment means judges that the acceleration request is a request for acceleration into a low-load region, judges whether combustion can be resumed;

wherein the EGR control means decreases the amount of exhaust gas recirculation when the condition for forced recovery is established, and includes fuel injection resumption means, which resumes fuel injection when the combustibility judgment means judges that combustion can be resumed.

2. The internal combustion engine control apparatus according to claim 1, further comprising:

throttle opening increase prohibition means for avoiding a larger throttle opening than an idle opening until combustion is judged to be resumable.

3. The internal combustion engine control apparatus according to claim 2, wherein the throttle opening is forcibly made larger than the idle opening if a predetermined period of time elapses since the detection of the acceleration request during a period before combustion is judged to be resumable.

4. The internal combustion engine control apparatus according to claim 1, wherein the EGR control means includes at least either variable valve timing control means, which increases/decreases the amount of internal exhaust gas recirculation by driving a variable valve mechanism that varies a valve overlap period during which an intake valve opening period overlaps with an exhaust valve opening period, or EGR valve control means, which increases/decreases the amount of external exhaust gas recirculation by adjusting the opening of an EGR control valve that is installed in an exhaust gas back-flow path for communicating between an intake path and an exhaust path.

5. The internal combustion engine control apparatus according to claim 4, wherein the combustibility judgment means judges according to at least either the amount of drive provided for the variable valve mechanism or the opening of the EGR valve whether combustion can be resumed.

6. An internal combustion engine control apparatus having fuel cut-off means for cutting off fuel at the time of internal combustion engine deceleration and EGR control means for controlling the amount of exhaust gas recirculation, wherein the EGR control means is capable of varying the amount of exhaust gas recirculation into a combustion chamber while fuel is cut off at the time of deceleration, the internal combustion engine control apparatus comprising:

forced recovery condition judgment means for judging according to an acceleration request detected during fuel cut-off at the time of deceleration that the condition for forced recovery from the fuel cut-off is established;

degree-of-requested-acceleration judgment means for judging the degree of requested acceleration in accordance with the acceleration request; and combustibility judgment means, which, when the degree-of-requested-acceleration judgment means judges that the acceleration request is a request for moderate acceleration, judges whether combustion can be resumed;

wherein the EGR control means decreases the amount of exhaust gas recirculation when the condition for forced recovery is established, and includes fuel injection resumption means, which resumes fuel injection when the combustibility judgment means judges that combustion can be resumed.

7. The internal combustion engine control apparatus according to claim 6, further comprising:

throttle opening increase prohibition means for avoiding a larger throttle opening than an idle opening until combustion is judged to be resumable.

8. The internal combustion engine control apparatus according to claim 7, wherein the throttle opening is forcibly made larger than the idle opening if a predetermined period of time elapses since the detection of the acceleration request during a period before combustion is judged to be resumable.

9. The internal combustion engine control apparatus according to claim 6, wherein the EGR control means includes at least either variable valve timing control means, which increases/decreases the amount of internal exhaust gas recirculation by driving a variable valve mechanism that varies a valve overlap period during which an intake valve opening period overlaps with an exhaust valve opening period, or EGR valve control means, which increases/decreases the amount of external exhaust gas recirculation by adjusting the opening of an EGR control valve that is installed in an exhaust gas back-flow path for communicating between an intake path and an exhaust path.

10. The internal combustion engine control apparatus according to claim 9, wherein the combustibility judgment means judges according to at least either the amount of drive provided for the variable valve mechanism or the opening of the EGR valve whether combustion can be resumed.

* * * * *